United States Patent
Yang et al.

(10) Patent No.: US 9,856,413 B2
(45) Date of Patent: Jan. 2, 2018

(54) VISCOELASTIC SURFACTANT HAVING MULTIPLE HYDROPHOBIC AND HYDROPHILIC GROUPS AS FRACTURING FLUIDS

(71) Applicant: PetroChina Company Limited, Beijing (CN)

(72) Inventors: Jiang Yang, Beijing (CN); Yongjun Lu, Beijing (CN); Baoshan Guan, Beijing (CN); Weixiang Cui, Beijing (CN); Xiaohui Qiu, Beijing (CN)

(73) Assignee: Petrochina Company Limited, Beijing (CN)

( * ) Notice: Subject to any disclaimer, the term of this patent is extended or adjusted under 35 U.S.C. 154(b) by 154 days.

(21) Appl. No.: 14/651,522

(22) PCT Filed: Sep. 6, 2013

(86) PCT No.: PCT/CN2013/083054
§ 371 (c)(1),
(2) Date: Jun. 11, 2015

(87) PCT Pub. No.: WO2014/089994
PCT Pub. Date: Jun. 19, 2014

(65) Prior Publication Data
US 2015/0322334 A1 Nov. 12, 2015

(30) Foreign Application Priority Data

Dec. 11, 2012 (CN) .......................... 2012 1 0533642

(51) Int. Cl.
*C09K 8/68* (2006.01)
*E21B 43/26* (2006.01)
*C09K 8/60* (2006.01)

(52) U.S. Cl.
CPC .............. *C09K 8/68* (2013.01); *C09K 8/602* (2013.01); *E21B 43/26* (2013.01); *C09K 2208/30* (2013.01)

(58) Field of Classification Search
None
See application file for complete search history.

(56) References Cited

U.S. PATENT DOCUMENTS

| | | | |
|---|---|---|---|
| 5,001,260 A | 3/1991 | Hayes | |
| 5,551,516 A | 9/1996 | Norman et al. | |
| 5,811,384 A | 9/1998 | Tracy et al. | |
| 5,964,295 A | 10/1999 | Brown et al. | |
| 6,121,222 A | 9/2000 | Li et al. | |
| 6,187,903 B1 | 2/2001 | Elsasser et al. | |
| 6,258,859 B1* | 7/2001 | Dahayanake | A61K 8/02 252/77 |
| 6,412,561 B1 | 7/2002 | Brown et al. | |
| 6,435,277 B1 | 8/2002 | Qu et al. | |
| 6,703,352 B2 | 3/2004 | Dahayanake et al. | |
| 8,022,016 B2 | 9/2011 | Li et al. | |
| 2011/0071056 A1 | 3/2011 | Saini et al. | |
| 2011/0256085 A1* | 10/2011 | Talingting Pabalan | A61K 8/042 424/70.13 |

FOREIGN PATENT DOCUMENTS

| | | |
|---|---|---|
| CN | 1752173 A | 3/2006 |
| CN | 1285700 C | 11/2006 |
| CN | 101775276 A | 7/2010 |
| CN | 102181279 A | 9/2011 |
| CN | 102559166 A | 7/2012 |
| WO | 2007066269 A2 | 6/2007 |

OTHER PUBLICATIONS

Chinese Search Report dated Dec. 1, 2014, issued in Application No. 201210533642.9 and English translation.
Office Action issued in Chinese Application No. 201210533642.9, dated Dec. 9, 2014 and English translation.
Yang, et al., "Viscoelastic wormlike micelles and their applications", Current Opinion in Colloid & Interface Science, 2002, 7: 276-281.
Hoffmann, et al., "The rheological behaviour of different viscoelastic.surfactant solutions: systems with and without a yield stress value", Tenside, surfactants, detergents, 1994, 31, 6:389-400.
International Search Report and Written Opinion issued in International Application No. PCT/CN2013/083054 dated Dec. 12, 2013.

* cited by examiner

*Primary Examiner* — John J Figueroa
(74) *Attorney, Agent, or Firm* — Meunier Carlin & Curfman LLC

(57) ABSTRACT

The present invention relates to viscoelastic fracturing fluids comprising one or more zwitterionic surfactants having multiple hydrophobic and hydrophilic groups. The viscoelastic fracturing fluids can be used to stimulate reservoir and increase oil and gas production.

9 Claims, No Drawings

VISCOELASTIC SURFACTANT HAVING MULTIPLE HYDROPHOBIC AND HYDROPHILIC GROUPS AS FRACTURING FLUIDS

FIELD OF THE INVENTION

The present invention relates to viscoelastic fracturing fluids which contain a surfactant with multiple hydrophobic and hydrophilic groups for stimulation oil and gas well.

BACKGROUND OF THE INVENTION

In order to produce oil and gas from reservoir, oil and gas have to pass through a sufficiently permeable flow path to the wellbore. For formation with low permeability, stimulation such as fracturing is needed to increase the permeability and increases the oil and gas production. Fracturing fluids are pumped at high pressure and rate into the reservoir interval to be treated, causing a vertical fracture to open. The wings of the fracture extend away from the wellbore in opposing directions according to the natural stresses within the formation. Proppant, such as grains of sand of a particular size, is mixed with the treatment fluid to keep the fracture open when the treatment is complete. Hydraulic fracturing creates high-conductivity communication with a large area of formation and bypasses any damage that may exist in the near-wellbore area. Therefore, it is important for the fluid to be viscoelastic to suspend and carry the proppant into the fracture.

Water soluble polymers such as guar and derivatives are commonly used to thicken the fluids. However, the polymer has residue left in the reservoir, which will damage the formation and affect the production rate.

Viscoelastic surfactant (VES) has been used in oil and gas applications as fracturing fluid. The viscoelastic surfactant forms wormlike micelles with self-assemble of surfactant, and gives viscoelastic properties. Unlike polymer thickener, viscoelastic surfactant based fluids do not reduce the permeability as no resides are left. In addition, it is simple to operate with fewer additives in the fields. No cross linking agent and breaker are needed for VES. Viscosity of the fluid is reduced upon exposure to crude oil, and therefore having better fracture clean up.

Viscoelastic surfactant is usually made of certain amount of suitable surfactants such as anionic, cationic, nonionic and zwitterionic surfactants. When concentration of surfactant exceeds a critical concentration, surfactant molecular aggregates into elongated micelle, which can interact to form a polymer like network exhibiting elastic behavior.

Cationic surfactant such as long chain quaternary ammonium salts have been used as fracturing fluids. Salts such as potassium chloride, ammonium chloride and sodium salicylate have been used to generate viscoelasticity. U.S. Pat. No. 5,551,516, U.S. Pat. No. 5,964,295, U.S. Pat. No. 6,435,277, and U.S. Pat. No. 6,412,561 were disclosed cationic surfactant to give viscoelasticity. Amphoteric/zwitterionic surfactants in mixture of organic acid, salts and cationic surfactants were also used to generate viscoelasticity which is described in U.S. Pat. No. 6,703,352, and U.S. Pat. No. 8,022,016.

The viscoelastic surfactant is typically used in concentration of 2~6%, which is much higher than that of a typical polymeric thickener at <0.6%. The high usage concentration of viscoelastic surfactant increases the cost of such materials and inhibits its widely application. It would be desirable to have VES fluids that could be formed and effective at lower usage concentration.

SUMMARY OF THE INVENTION

The present invention provides a viscoelastic surfactant that is effectives at low concentration.

It is still another object of the present invention to provide the preparation method of viscoelastic surfactant.

It is still another object of the present invention to have the viscoelastic surfactant and their mixture that are useful as thickener for oil and gas well stimulation applications.

It is still another object of the present invention to provide a viscoelastic fluid of treating a subterranean oil gas formation comprising the viscoelastic surfactant.

It is still another object of the present invention to provide a preparation method of the viscoelastic fluid.

It is still another object of the present invention to provide a use of the viscoelastic fluid for fracturing and treatment of subterranean formation which comprises oil or gas bearing zone.

It is still another object of the present invention to provide a method to fracture oil or gas formation wherein utilize the viscoelastic fluid.

According to this and other objects, this invention specifically relates to fluid comprising one or more selected zwitterionic surfactants with multiple hydrophobic and hydrophilic groups, cosurfactant, brine and water.

This invention provides a viscoelastic fluid of treating a subterranean oil gas formation comprising:
(1) a zwitterionic surfactants with multiple hydrophobic and hydrophilic groups from 0.1% to about 5%,
(2) an anionic surfactant from about 0.1% to about 2%,
(3) a salt from 0 to about 5%,
(4) water is balance to 100%,
wherein the zwitterionic surfactants with multiple hydrophobic and hydrophilic groups have two or three hydrophobic and hydrophilic groups and amide linkage.

The zwitterionic surfactants with multiple hydrophobic and hydrophilic groups have the following structural formula:

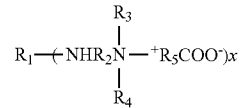

Wherein x is 2 or 3, $R_1$ is the acyl group of a polymeric fatty acid of total 24~54 hydrocarbon with x acyl groups, $R_2$ is a divalent aliphatic hydrocarbon group with 2 to 5 carbon atoms, $R_3$, $R_4$ independently of one another are aliphatic hydrocarbon groups with 1 to 4 carbon atoms, $R_5$ is $CH_2$— or $CH_2CH_2$— group.

DETAILED DESCRIPTION OF THE INVENTION

The property of viscoelasticity of fluid is described in the literature, Hoffmann et al, "The Rheological Behavior of Different Viscoelastic Surfactant Solutions", Tenside Surf. Det., 31, 389-400, 1994, and Yang, "Viscoelastic Wormlike Micelle and Their Applications", Current Opinion in Colloid and Surface Science, 7, 276-281, 2002. The viscoelasticity of an aqueous solution can be visually observed by swirling of the solution and bubble recoil after the swirling is stopped. Any recoil of the bubbles indicates viscoelasticity. The viscoelasticity of fluid can be quantitatively measured by dynamic rheological properties. If the storage modulus (G') is larger than the loss modulus (G'') at some point or over some range of points below about 10 rad/sec, typically between about 0.001 to about 10 rad/sec, the fluid is typically considered viscoelastic.

Viscoelasticity of surfactant solution is caused by worm-like micelle. The surfactant is usually aggregated into spherical micelles firstly, and changed to worm-like micelles upon changing environment and increasing the concentration.

The viscoelastic surfactants useful in the fluids of the present invention are selected zwitterionic surfactants having multiple hydrophobic and hydrophilic groups. A zwitterionic surfactant has a permanently positively charged moiety in the molecules regardless of pH and a negatively charged moiety at alkaline pH. The fluids are used in conjunction with co-surfactants and water soluble salts. The co-surfactants are anionic or cationic surfactant, preferably anionic surfactants. The anionic surfactants contain a hydrophobe having at least about 8 carbon atoms. The selected viscoelastic surfactants form a viscoelastic fluid that exhibits enhanced performance compared to conventional viscoelastic surfactant. The viscoelastic fluid of the present invention exhibit high viscosity level at high temperature and low concentration.

The zwitterionic surfactants with multiple hydrophobic and hydrophilic groups have the following structural formula:

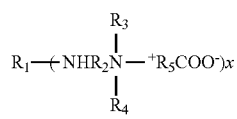

Wherein x is a number from 2 to 3, $R_1$ is the acyl group of a dimeric or trimeric fatty acid of total 24~54 hydrocarbon with x acyl groups, $R_2$ is a divalent aliphatic hydrocarbon group with 2 to 5 carbon atoms, $R_3$, $R_4$ independently of one another are aliphatic hydrocarbon groups with 1 to 4 carbon atoms, $R_5$ is the —$CH_2$-radical or $CH_2CH_2$— group.

The acyl groups $R_1$ of a dimeric or trimeric fatty acid in fracturing fluids of present invention include the following structures II-VII:

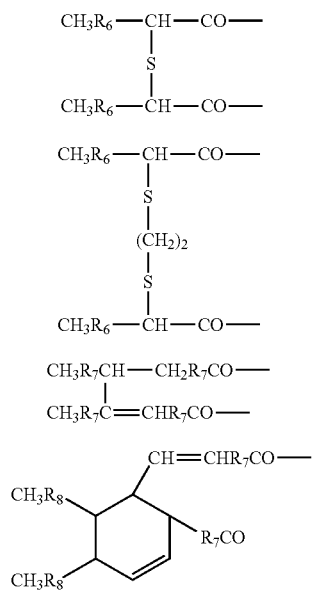

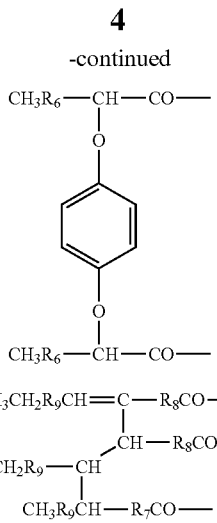

Wherein, in structure from II to VII above, $R_6$ is an aliphatic moiety having from 9 to 19 carbon atoms, aliphatic group can be straight or branch chain and which may be saturated or unsaturated. $R_7$ is an aliphatic moiety having 7 carbon atoms. $R_8$ is an aliphatic moiety having 5 carbon atoms. $R_9$ is an aliphatic moiety having 8 carbon atoms.

According the present invention, one or more zwitterionic surfactants with multiple hydrophobic and hydrophilic groups can be selected from the group consisting of bisthio alkylamidopropyl betaine, bisthioether alkylamidopropyl betaine, dimer amidopropyl betaine, trime amidopropyl betaine, and hydroquinone bisalkylamidopropyl betaine, wherein alkyl represents a group that contains from about 12 to about 24 carbon atoms which may be branched or straight chained and which may be saturated or unsaturated.

According the present invention, the zwitterionic surfactants with multiple hydrophobic and hydrophilic groups can be synthesized as follows: bisacid, dimer acid, or trimer acid react with alkyl amine, and further react with sodium monochloroacetate. The dimeric, trimeric acids are acid from oligomerization of oleic acid. The bisacids are covalent linked by thiolether, bisthiolether, or diether groups.

The bisacid can be synthesized according to intermediates in U.S. Pat. No. 5,811,384 and U.S. Pat. No. 6,121,222. Dimeric and trimeric acid can be synthesized by oligomerization of oleic acid according to U.S. Pat. No. 5,001,260 and U.S. Pat. No. 6,187,903. Structure IV and V are possible isomer of dimeric acid. The commercial available dimeric and trimeric acid are also available from Henkel Corporation (4900 Este Avenue-Bldg 53, Cincinnati, Ohio 45232, USA) and Uniqema Corporation (PO Box 90, Wilton Center, Middleborough, Cleveland TS90 8JE, UK). The dimeric or bis amide is made by reaction of dimeric or bisacid with alkylamide at 1:2 molar ratio. Trimeric amide is made by reaction of trimeric acid with alkylamide at 1:3 molar ratio. The zwitterionic surfactants with multiple hydrophobic and hydrophilic groups are synthesized by reaction of dimeric or trimeric amide with sodium monochloroacetate.

According the present invention, the zwitterionic surfactants with multiple hydrophobic and hydrophilic groups are used in an amount which in combination with the other co-surfactants is sufficient to form a viscoelastic fluid, which amount of co-surfactants will typically be a minor amount by weight of the fluid (e.g. less than about 50% by relative weight). Examples of suitable anionic surfactants include alkyl sulfates, sulfonates, phosphates, or carboxylates having alkali metal counter ions or amine, where alkyl represents a group that contains from about 12 to about 24 carbon atoms which may be branched or straight chained and which may be saturated or unsaturated. The amount of co-surfactant is from 0.1% to 2% in the final fluid. It is also conceivable to combine the above zwitterionic surfactant with nonionic and cationic surfactants to get desired viscoelastic fluid from a skilled worker. The amount of other surfactants can be added from 0.1% to 2%. Nonionic surfactants are alkyl ethoxylate, alkyl gluocoside, and cationic surfactants are alkyl quaternary amine, wherein alkyl represents a group that contains from about 12 to about 24 carbon atoms. The solvent such as methanol, ethanol, isopropanol, and propylene glycol can be also used to solubilize the thickener.

The viscoelastic surfactant used as fracturing fluid may optionally include clay stabilizer such as KCl, NH$_4$Cl and quaternary amine salt. Amount of clay stabilizer used is from 0 to 4%.

The fluid can further contain one or more additives such as breaker aids, scale inhibitor, chelating agent, and bactericides.

In another embodiment, the present invention relates to methods of preparation of viscoelastic fluid. The methods include mixing of zwitterionic surfactants with multiple hydrophobic and hydrophilic groups and anionic surfactants in suitable ratio and form viscoelastic fluid.

In yet another embodiment, the present invention relates to application of viscoelastic fluid in hydraulically fracturing a subterranean formation. The application of such fluid will be known to persons of ordinary skill in the art.

In yet another embodiment, the present invention relates to a method of hydraulically fracturing a subterranean formation. Techniques for hydraulically fracturing a subterranean formation will be known to persons of ordinary skill in the art, and will involve pumping the fracturing fluid into the borehole and out into the surrounding formation. The fluid pressure is above the minimum in situ rock stress, thus creating or extending fractures in the formation.

Therefore, the present invention provides a viscoelastic fracturing fluid containing the zwitterionic surfactants with multiple hydrophobic and hydrophilic groups and co-surfactants. The viscoelastic fracturing fluid of present invention is effectives at lower concentration than that of conventional fracturing fluid.

The following are examples of the present invention. They are illustrative of the invention and are not to be construed as limiting. Unless otherwise indicated, all percentages or parts are by weight.

Example 1

Preparation of Bisthioether Laurylamidopropyl Betaine 1.1. α-Bromolauric Acid Chloride

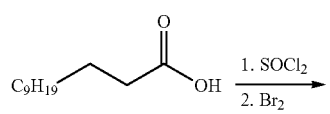

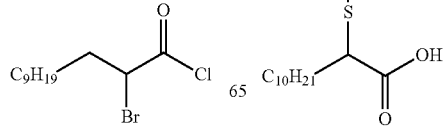

Pure lauric acid (100 g. 0.5 mol) was dissolved in thionyl chloride (89 g, 0.75 mol) at 55° C. under nitrogen. A large amount of hydrogen chloride gas was generated. When lauric acid was all converted to acid chloride and there was no more HCl gas being generated after stirring for 2.5 hours, bromine (89.25 g, 0.65 mol) was slowly added to the solution at room temperature. The reaction mixture was stirred for another 8 hours at 45° C. The reaction was then stopped by evaporating additional bromine at 80° C. by bubbling in nitrogen. The final crude product was extracted twice with hexane. The NMR results showed that product was completely pure. The yield of the reaction was about 98%.

1.2. Bisthioether Lauric Acid

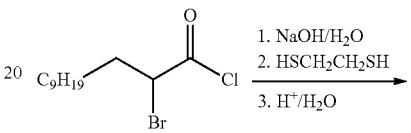

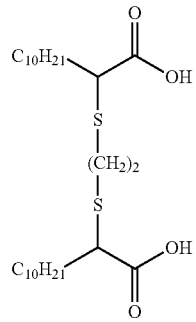

α-Bromolauric acid chloride (110 g, 0.37 mmol) was stirred with two equivalent weight sodium carbonate in a water solution at 70° C. for 3 hours. The temperature was then lowered at 30° C. and ethylenedithiol (17 g, 0.18 mmol) was added to the reaction mixture. After the reaction has been stirred for 15 hours at 70° C., the solution was cooled to room temperature and acidified to about pH 2. The crude product was extracted with n-butanol twice. Once the solvent was evaporated, the remaining solid material was collected and dried under vacuum. The NMR results confirmed the solid material formed was the expected product. The yield of the reaction was about 85%.

1.3. Bisthioether Laurylamino Propylamide

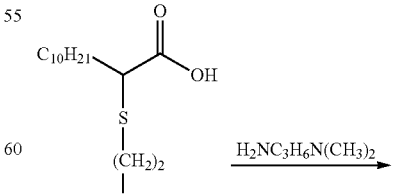

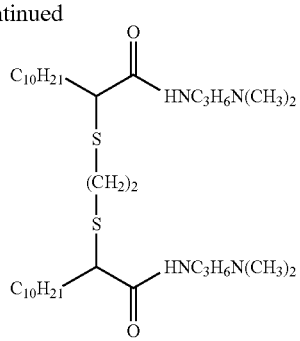

Bisthioether lauric acid (100 g, 0.2 mol) and dimethylaminopropylamine (45.8 g, 0.45 mol) was mixed together and reacted at 160-180° C. under nitrogen for 8 hours, and by product water was distilled off. The reaction is continued until the acid number is <6. Unreacted dimethylaminopropylamine is removed by steam distillation.

1.4. Bisthioether Lauryl Amidopropyl Betaine

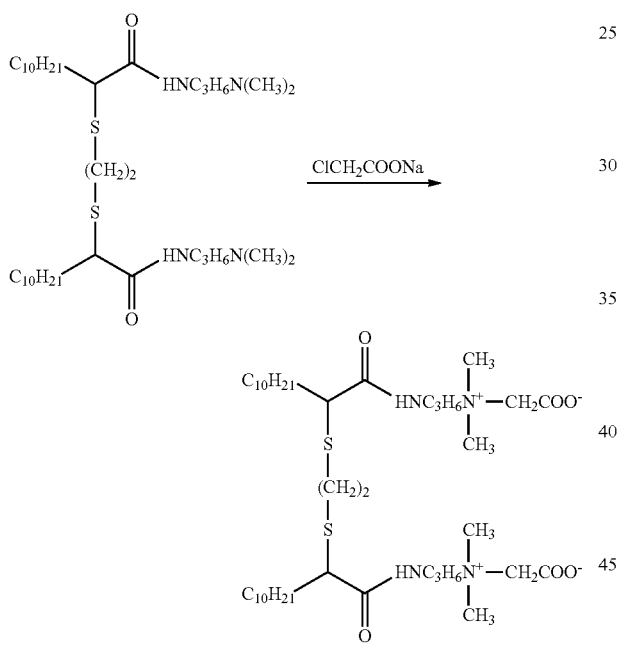

Sodium chloroacetate (18 g, 0.154 mol) was dissolved to 140 ml water and heated up to 80° C. Bisthioether laurylamino propylamide (50 g, 0.076 mol) was then added. The reaction was maintained for 4-6 hours at 70-80° C. and pH>8.5. The completion of the reaction was checked by amount of by product sodium chloride and thin-layer chromatography. The reaction was finished when conversion rate is over 95%.

Example 2

Preparation of Dimer and Trimer Alkylamidopropyl Betaine 2.1. Dimer and Trimer Alkylamidopropyl Amide 100 gram of high purity dimer acid (>95%) or average grade of dimer acid (80%) containing trimer acid (20%) and 38.3 gram of dimethylaminopropylamine (0.38 mol) were mixed together and reacted under nitrogen at 160-180° C. for 8 hours, and by product water was distilled off. The reaction is continued until the acid number is <6. Unreacted dimethylaminopropylamine is removed by steam distillation.

2.2. Dimer and Trimer Alkylamidopropyl Betaine

Sodium chloroacetate (15.7 g, 0.135 mol) was dissolved to 137 ml water and heated up to 80° C. Dimer, trimer alkylamidopropyl amide or their mixture (50 g) was then added. The reaction was maintained for 4-6 hours at 70-80° C. and pH>8.5. The completion of the reaction was checked by amount of by product sodium chloride and thin-layer chromatography. The reaction was finished when conversion rate is over 95%. The final product have active dimer and trimer alkylamidopropyl betaine at about 30%. The final product has following structure or mixture:

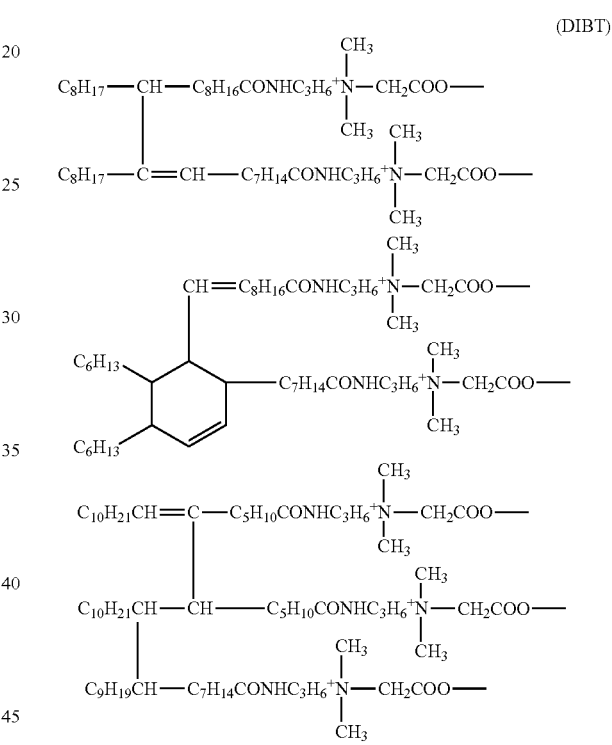

Example 3

Viscosity of the Inventive Betaine Mixture

The viscosity of fluid with different composition was measured on Haake RS600 rhometer. The different betaine surfactants at 1% were mixed with 0.15% anionic surfactant.

The abbreviation of zwitterionic surfactants is as follow:

BTBT: Bisthio Octyldecylamidopropyl Betaine (Structure II)

BTEBT: Bisthioether Laurylamidopropyl Betaine (Structure III)

DIBT: Dimer Alkyl (C36) amidopropyl Betaine (Structure IV, V)

TDIBT: Mixture of Dimer Alkyl (C36) amidopropyl Betaine (80%) and Trimer Alkyl (C54) amidopropyl Betaine (20%) (Structure IV, V, VII mixture)

HQBBT: Hydroquinone Bisoctyldecylamidopropyl Betaine (Structure VI)

DBT: Dodecylamido propyl betaine
OBT: Oleyl amido propyl betaine.
The abbreviation of anionic surfactants is as follow:
SDP: Sodium dodecyl phosphate
SOS: Sodium octyldecyl sulfate
STC: Sodium tetradecyl carboxylate
ABS: Sodium octyldecyl sulfonate.
The viscosity at 100 s$^{-1}$ and 50° C. was shown in Table 1 below.

TABLE 1

|  | SDP mixture | SOS mixture | STC mixture | ABS mixture | No mixture |
|---|---|---|---|---|---|
| BTBT | 62 | 75 | 67 | 70 | 33 |
| BTEBT | 56 | 63 | 53 | 56 | 22 |
| DIBT | 60 | 64 | 62 | 62 | 31 |
| TDIBT | 71 | 80 | 72 | 72 | 32 |
| HQBBT | 65 | 72 | 68 | 60 | 29 |
| DBT | 10 | 15 | 13 | 16 | 5 |
| OBT | 25 | 27 | 26 | 24 | 7 |

It can be seen from Table 1 that fluids containing inventive zwitterionic surfactants with multiple hydrophobic and hydrophilic groups have higher viscosity than that of conventional surfactant.

Example 4

Dynamic Rheological Properties of the Inventive Betaine Mixture

The dynamic viscoelasticity of fluids in example 3 was further measured on Haake Mar rheometer. The results showed that G'(elastic modulus) is larger than G"(viscous modulus) at very low frequency of 0.01 rad/s for fluids containing zwitterionic surfactants with multiple hydrophobic and hydrophilic groups, which indicated their high elastic and proppant suspension ability for fracturing applications. The G' is larger than G" at higher frequency (0.15 rad/s) for conventional zwitterionic surfactant, which indicated relative lower elasticity.

The invention claimed is:

1. A viscoelastic fluid of treating a subterranean oil gas formation comprising:
   (1) a zwitterionic surfactant with multiple hydrophobic and hydrophilic groups from 0.1% to about 5%,
   (2) an anionic surfactant from about 0.1% to about 2%,
   (3) a salt from 0 to about 5%,
   (4) water is balance to 100%,
   wherein the zwitterionic surfactant has the following structural formula:

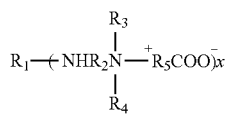
I wherein x is 2 or 3, $R_1$ is the acyl group of a dimeric or trimeric fatty acid of total 24 to 54 carbon with x acyl groups, $R_2$ is a divalent aliphatic hydrocarbon group with 2 to 5 carbon atoms, $R_3$ and $R_4$ independently of one another are aliphatic hydrocarbon groups with 1 to 4 carbon atoms, $R_5$ is the —CH$_2$-radical or CH$_2$CH$_2$— group.

2. The viscoelastic fluid according to claim 1, wherein $R_1$ has one of the following formulas from II to VII:

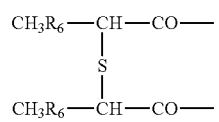
II

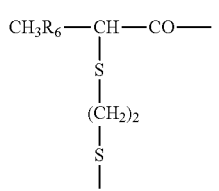
III

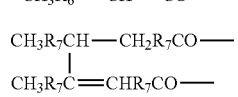
IV

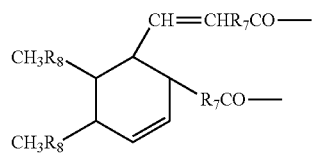
V

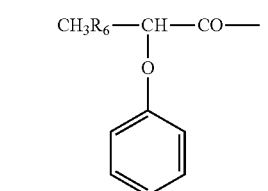
VI

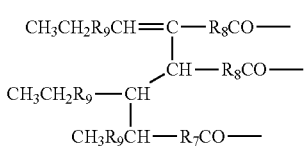
VII wherein, in the structures from II to VII above, $R_6$ is an aliphatic moiety having from 9 to 19 carbon atoms, wherein the aliphatic group can be straight or branch chain and which may be saturated or unsaturated, $R_7$ is an aliphatic moiety having 7 carbon atoms, $R_8$ is an aliphatic moiety having 5 carbon atoms, and $R_9$ is an aliphatic moiety having 8 carbon atoms.

3. The viscoelastic fluid according to claim 1, wherein the zwitterionic surfactant is selected from the group consisting of bisthio alkylamidopropyl betaine, bisthioether alkylamidopropyl betaine, dimer amidopropyl betaine, trime amidopropyl betaine, and hydroquinone bisalkylamidopropyl betaine, wherein alkyl represents a group that contains from about 12 to about 24 carbon atoms which may be branched or straight chained and which may be saturated or unsaturated.

4. The viscoelastic fluid according to claim 1, wherein the anionic surfactant is selected from the group consisting of alkyl phosphate, alkyl sulfate, alkyl ether sulfate, alkyl sulfonate, and alkyl carboxylate, where alkyl represents a group that contains from about 12 to about 18 carbon atoms which may be branched or straight chained and which may be saturated or unsaturated.

5. The viscoelastic fluid according to claim 1, wherein the zwitterionic surfactant are prepared by the reaction of a bisacid, dimer acid, or trimer acid with an alkyl amine, and further reacted with sodium monochloroacetate; wherein the dimer and trimer acids are from the oligomerization of oleic acid; and the bisacids are covalently linked by thiolether, bisthiolether, or diether groups.

6. The viscoelastic fluid according to claim 1, wherein the fluid may contain one or more clay stabilizers.

7. A preparation method of viscoelastic fluid according to claim 1, where the zwitterionic surfactant combine with the anionic surfactant and form a viscoelastic fracturing fluid.

8. A method to fracture an oil or gas formation comprising utilizing the viscoelastic fluid according to claim 1.

9. The viscoelastic fluid according to claim 6, wherein the one or more clay stabilizers are selected from the group consisting of KCl, NH$_4$Cl, quaternary amine salts, breaker aids, scale inhibitors, chelating agents, and bactericides.

\* \* \* \* \*